United States Patent
Oh et al.

(10) Patent No.: US 10,076,987 B2
(45) Date of Patent: Sep. 18, 2018

(54) HEATING AND COOLING CUP HOLDER

(71) Applicants: Hyundai Motor Company, Seoul (KR); KBAUTOTECH CO., LTD., Asan-si, Chungcheongnam-do (KR)

(72) Inventors: Man Ju Oh, Yongin-si (KR); Jae Woong Kim, Hwaseong-si (KR); Jae Woo Park, Ansan-si (KR); Jae Hoon Kim, Cheonan-si (KR)

(73) Assignees: Hyundai Motor Company, Seoul (KR); KBAUTOTECH CO., LTD., Asan-si (KR)

( * ) Notice: Subject to any disclaimer, the term of this patent is extended or adjusted under 35 U.S.C. 154(b) by 272 days.

(21) Appl. No.: 14/517,626

(22) Filed: Oct. 17, 2014

(65) Prior Publication Data

US 2015/0107271 A1   Apr. 23, 2015

(30) Foreign Application Priority Data

Oct. 21, 2013   (KR) ......................... 10-2013-0125639

(51) Int. Cl.
*B60N 3/10* (2006.01)
*F25B 21/04* (2006.01)
*F25D 31/00* (2006.01)

(52) U.S. Cl.
CPC .............. *B60N 3/104* (2013.01); *F25B 21/04* (2013.01); *F25B 2321/02* (2013.01); *F25D 31/006* (2013.01); *F25D 31/007* (2013.01)

(58) Field of Classification Search
CPC ...... B60N 3/104; F25B 21/04; F25B 2321/02; F25D 31/006; F25D 31/007
See application file for complete search history.

(56) References Cited

U.S. PATENT DOCUMENTS 5,720,171 A    2/1998  Osterhoff et al.
6,449,958 B1 *  9/2002  Foye ..................... B60N 3/101
                                                  62/3.2

(Continued)

FOREIGN PATENT DOCUMENTS

JP      2001-208465 A        8/2001
JP      2001208465 A  *  8/2001  .............. F25B 21/02

(Continued)

*Primary Examiner* — Frantz Jules
*Assistant Examiner* — Lionel Nouketcha
(74) *Attorney, Agent, or Firm* — Morgan, Lewis & Bockius LLP

(57) ABSTRACT

A heating and cooling cup holder may include an inner holder having an air hole, a heat exchanging unit covering the air hole and having an intake port at a first side so that air flowing inside through the intake port exchanges heat through heat transfer fins in the heat exchanging unit and flows into the inner holder through the air hole, a peltier element having a front coupled to a rear of the heat exchanging unit, a heat dissipation module including a heat sink and a heat dissipating fan coupled to the rear of the peltier element, an outer holder surrounding the side of the inner holder and defining a ventilation space together with the inner holder therebetween, and a blower disposed in the ventilation space and having a discharge port connected to the intake port of the heat exchanging unit.

11 Claims, 6 Drawing Sheets

(56) References Cited

U.S. PATENT DOCUMENTS

| | | | |
|---|---|---|---|
| 7,089,749 B1 * | 8/2006 | Schafer | B60H 1/00264 62/3.2 |
| 7,748,223 B2 | 7/2010 | Minoura | |
| 7,856,831 B2 | 12/2010 | Flinner et al. | |
| 8,104,295 B2 | 1/2012 | Lofy | |
| 2005/0081556 A1 * | 4/2005 | Kim | F24F 3/16 62/411 |
| 2013/0227966 A1 * | 9/2013 | Ayres | F25B 21/02 62/3.2 |

FOREIGN PATENT DOCUMENTS

| | | |
|---|---|---|
| KR | 10-2006-0114593 A | 11/2006 |
| KR | 10-2007-0069058 A | 7/2007 |
| KR | 10-1137031 B1 | 4/2012 |
| KR | 10-2013-0074934 A | 7/2013 |
| WO | WO 2005031240 A1 * | 4/2005 ......... F28D 1/05366 |

* cited by examiner

HEATING AND COOLING CUP HOLDER

CROSS REFERENCE TO RELATED APPLICATION

The present application claims priority to Korean Patent Application Number 10-2013-0125639 filed Oct. 21, 2013, the entire contents of which is incorporated herein for all purposes by this reference.

BACKGROUND OF THE INVENTION

Field of the Invention

The present invention, in general, relates to a heating and cooling cup holder that users can conveniently use due to its rapid effect and improved performance and that has a high commercial value because it can rapidly provide users with a cold drink or a hot drink in a vehicle.

Description of Related Art

Cup holders are mounted on vehicles. Most of the cup holders have the function of simply holding cups, but there are also cup holders that have the function of cooling/heating a cup in some kinds of vehicles.

However, those cup holders of the related art generally cool/heat cups, simply using only heat conduction, so there is a problem in that cups are not sufficiently cooled/heat by heat conduction alone.

Peltier elements are used for cup holders in the related art, but cups in the cup holders are heated or cooled only by heat conduction through the bodies of the cup holders.

This configuration has a problem in that cooling/heating by heat conduction is not sufficient when the contact area between a cup and the cup holders is small. The sizes of cups and the cup holders are not always the same, there are cups with recessed bottoms, and there is little heat transfer through conduction in paper cups made of paper with low thermal conductivity, so the temperature of the cups simply maintains equilibrium with the temperature around the cups.

Therefore, there is a need of a cup holder that can practically and efficiently cool/heat cups by solving these problems.

Further, a related art proposes a cup holder, but it also achieves cooling/heating by conduction only, so there is a problem in that the efficiency of cooling/heating is very low in practice.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a heating and cooling cup holder that users can conveniently use due to its rapid operation and improved performance and that has a high commercial value because it can rapidly provide users with a cold drink or a hot drink in a vehicle.

According to various aspects of the present invention, a heating and cooling cup holder may include an inner holder receiving a drink through an open top of the inner holder, keeping the drink, and having an air hole at a side of the inner holder through which air flows inside, a heat exchanging unit covering the air hole with a front of the heat exchanging unit from an adjacent outside of the inner holder and having an intake port at a first side of the heat exchanging unit and heat transfer fins therein so that air flowing inside through the intake port exchanges heat through the heat transfer fins and then flows into the inner holder through the air hole, a peltier element having a front thereof coupled to a rear of the heat exchanging unit, a heat dissipation module coupled to the rear of the peltier element; an outer holder having an inner diameter larger than an outer diameter of the inner holder, surrounding the side of the inner holder, and defining a ventilation space together with the inner holder therebetween, and a blower disposed in the ventilation space, receiving air in the ventilation space, and having a discharge port connected to the intake port of the heat exchanging unit.

The heat exchanging unit may have the intake port at the first side of the heat exchanging unit and may be combined with the inner holder with the air hole near a second side of the heat exchanging unit.

The heat transfer fins may be guide ribs guiding air which flows inside of the heat exchanging unit through the intake port to the air hole.

The guide ribs may be plate-shaped columns protruding from the rear of the heat exchanging unit and coming in contact with an outer side of the inner holder.

The guide ribs may be arranged in lines to define a series of channels from the intake port to the air hole and a plurality of guide rib lines may form a plurality of channels adjacent to each other.

The front of the heat exchanging unit may be a curved surface being in close contact with an outer side of the inner holder.

The outer holder may be cut off at a portion where the heat exchanging unit is, surrounding the side of the inner holder, and the cut-off portion of the outer holder may be coupled to the heat dissipation module.

The heat dissipation module may include the heat sink having a front being in close contact with a rear of the peltier element and the heat dissipation fan coupled to a rear of the heat sink.

A first side of the front of the heat sink may be in close contact with the peltier element and the heat dissipation fan may be coupled to a second side of the rear of the heat sink.

The heat dissipation fan may receive air having exchanged heat with the heat sink and may have a discharge port at a side of the heat dissipation fan.

The inner holder, the heat exchanging unit, the peltier element, the heat dissipation module, the outer holder, and the blower may be disposed on an arm rest in a vehicle.

The heat dissipation fan may suck air having exchanged heat with the heat sink and may have a discharge port at a side, and the discharge port may extend to communicate with the outside of an arm rest.

The inner holder, the heat exchanging unit, the peltier element, the heat dissipation module, the outer holder, and the blower may be disposed on an arm rest in a vehicle.

The heat dissipation fan may receive air having exchanged heat with the heat sink and may have a discharge port at a side, and the discharge port may extend to communicate with an outside of an arm rest.

According to the heating and cooling cup holder having the structure described above, when keeping a drink cold or hot, it is possible to maximize the performance, as compared with existing refrigerators, and to prevent heat from leaking outside by controlling air flow, thereby improving thermal efficiency.

Therefore, it is possible to improve convenience for a user through rapid effect and improved performance and to rapidly provide a user with a cold drink or a hot drink in a vehicle, so a commercial value can be increased.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
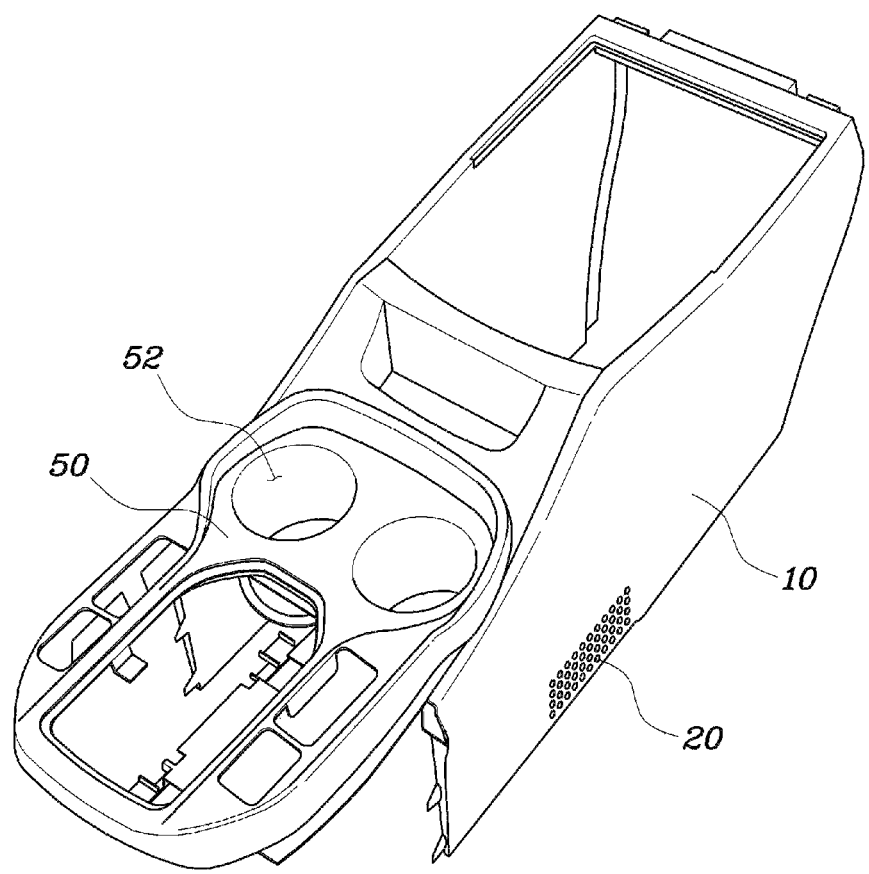
FIG. 1 is a perspective view of an exemplary heating and cooling cup holder according to the present invention on an arm rest.

FIG. 1 is a perspective view of a heating and cooling cup holder according to various embodiments of the present invention on an arm rest 10. The heating and cooling cup holder of the present invention may be mounted on an arm rest 10. The arm rest 10 has a cup holder cover 50, a cup is held through the top 52 of the cover 50, and the cup holder of the present invention is disposed under the cup.

The heating and cooling cup holder of the present invention includes an inner holder 100 that receives a drink through an open top, keeps the drink, and has an air hole 120 at the side through which air flows inside, a heat exchanging unit 300 that covers the air hole 120 with its front from outside the inner holder 100 and has an intake port 320 at a first side and heat transfer fins 340 therein so that air flowing inside through the intake port 320 exchanges heat through the heat transfer fins 340 and then flows into the inner holder 100 through the air hole 120, a peltier element 900 of which the front is coupled to the rear of the heat exchanging unit 300, a heat dissipation module that is coupled to the rear of the peltier element 900, an outer holder 200 that has a diameter larger than that of the inner holder 100, surrounds the side of the inner holder 100, and defines a ventilation space together with the inner holder 100 therebetween, and a blower 700 that is disposed in the ventilation space, sucks air from the ventilation space, and has a discharge port connected to the intake port 320 of the heat exchanging unit 300.

Figure 2:
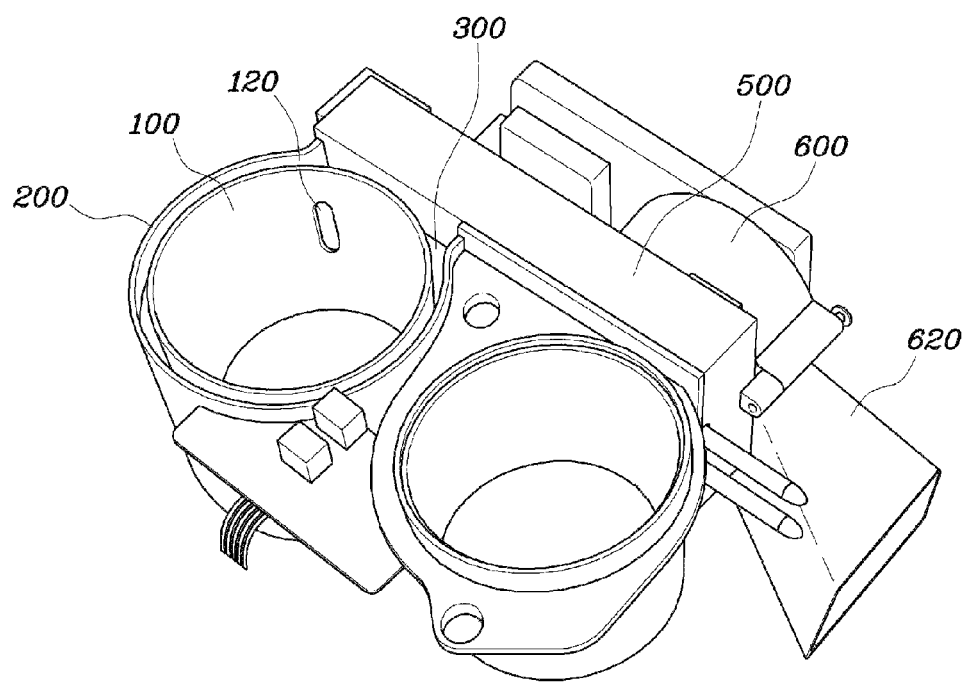
FIG. 2 is a perspective view of the exemplary heating and cooling cup holder according to the present invention.
Figure 3:
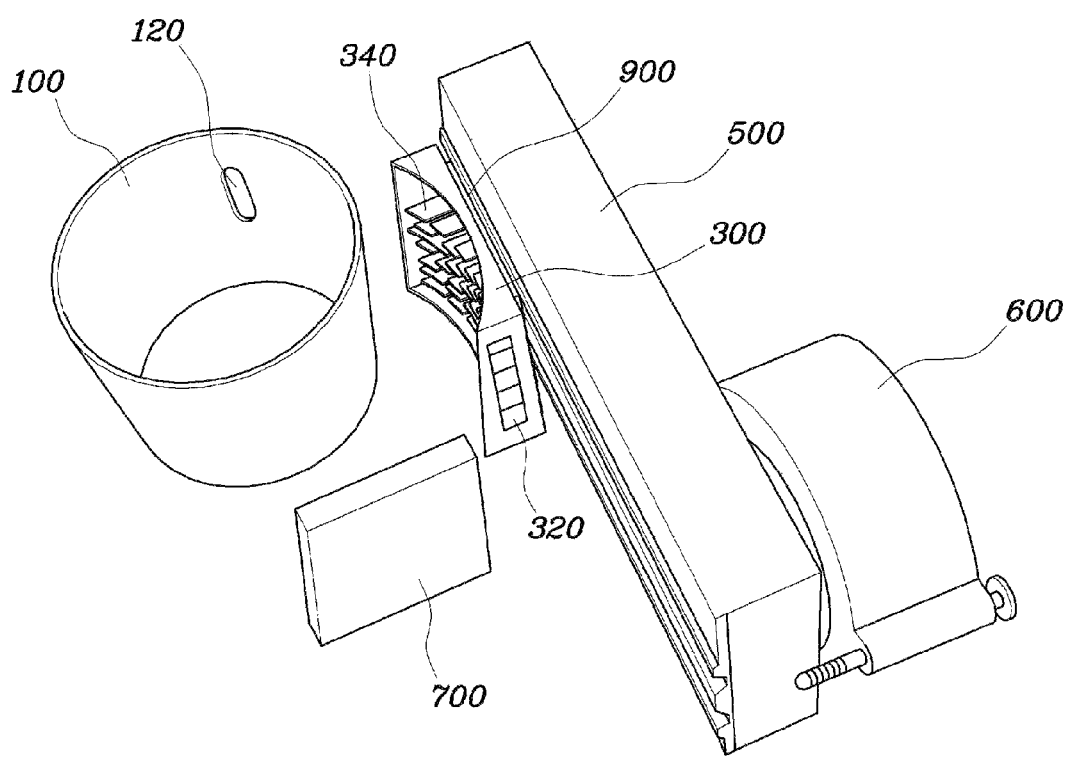
FIG. 3 is an exploded perspective view of the exemplary heating and cooling cup holder according to the present invention.
Figure 4:
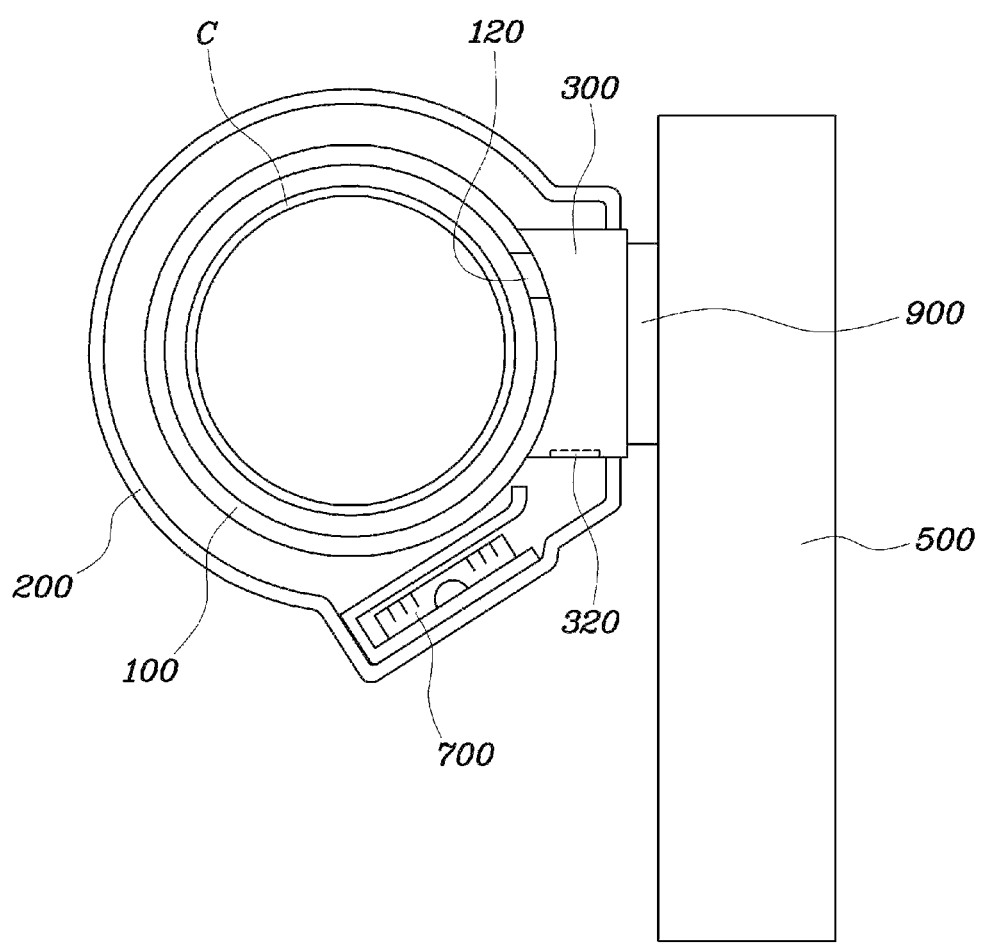
FIG. 4 is a cross-sectional view of the exemplary heating and cooling cup holder according to the present invention.

FIG. 2 is a perspective view of the heating and cooling cup holder according to various embodiments of the present invention, FIG. 3 is an exploded perspective view of the heating and cooling cup holder according to various embodiments of the present invention, and FIG. 4 is a cross-sectional view of the heating and cooling cup holder according to various embodiments of the present invention.

The inner holder 100 may be made of a heat conductive material such as metal and both of convection and conduction are achieved by the inner holder 100. The inner holder 100 receives a drink through the open top and keeps the drink and the air hole 120 through which air flows inside is formed through the side of the inner holder 100. Conditioned air flowing inside through the air hole 120 contacts a cup C, and then moves up and flows back into the blower 700.

The heat exchanging unit 300 covers the air hole 120 with its front from outside the inner holder 100. The heat exchanging unit 300 has the intake port 320 at a first side to take air inside and has the heat transfer fins 340 therein, such that air flowing inside through the intake port exchanges heat through the heat transfer fins 340. The air that has exchanged heat flows into the inner holder 100 through the air hole 120 and transfers heat to the cup C by means of convection.

The peltier element 900 has the front coupled to the rear of the heat exchanging unit 300 and directly cools or heats the heat exchanging unit 300. Accordingly, the air flowing into inner holder 100 through the heat exchanging unit 300 is conditioned. Further, the heat exchanging unit 300 is directly coupled to the inner holder 100, such that it cools or heats the entire inner holder 100 to make heat transfer between the inner holder 100 and the cup C by means of conduction and the air between the inner holder 100 and the cup C can more efficiently transfer heat through convection by the conduction made by the inner holder 100.

The heat dissipation module is coupled to the rear of the peltier element 900 and removes opposite-side heat of the peltier element 900.

The outer holder 200 has a diameter larger than that of the inner holder 100, surrounds the side of the inner holder 100, and defines a ventilation space together with the inner holder 100 therebetween. The blower 700 is disposed in the ventilation space, receives air from the ventilation space, and has a discharge port connected to the intake port of the heat exchanging unit 300, so it supplies the sucked air to the heat exchanging unit 300.

Accordingly, the air between the cup C and the inner holder 100 flows over the top and keeps flowing into the space between the inner holder 100 and the outer holder 200, as shown in FIG. 4, and then it is sent to the heat exchanging unit 300 through the blower 700. The heat exchanging unit 300 conditions the air and sends it back to the space between the inner holder 100 and the cup C. At the same time, the heat exchanging unit 300 directly exchanges heat with the inner holder 100 through conduction, so the cup can be heated/cooled by convection and conduction and the convection current of the air keeps being circulated and conditioned, thereby increasing air-conditioning efficiency and achieving rapid effect. This is basically because the peltier element 900 cools/heats the heat exchanging unit 300, while the heat at the opposite side of the peltier element 900 is dissipated by the heat dissipation module, such that the peltier element 900 can be stably operated.

The heat exchanging unit 300 has the intake port 320 at the first side and is combined with the inner holder 100 with the air hole 120 near the second side so that air can be sufficiently conditioned therein by the heat transfer fins 340.

The heat transfer fins 340 may be guide ribs that guide the air, which flows inside through the intake port 320, to the air hole 120. The guide ribs may be plate-shaped columns protruding from the rear of the heat exchanging unit 300 and coming in contact with the outer side of the inner holder 100.

Figure 5:
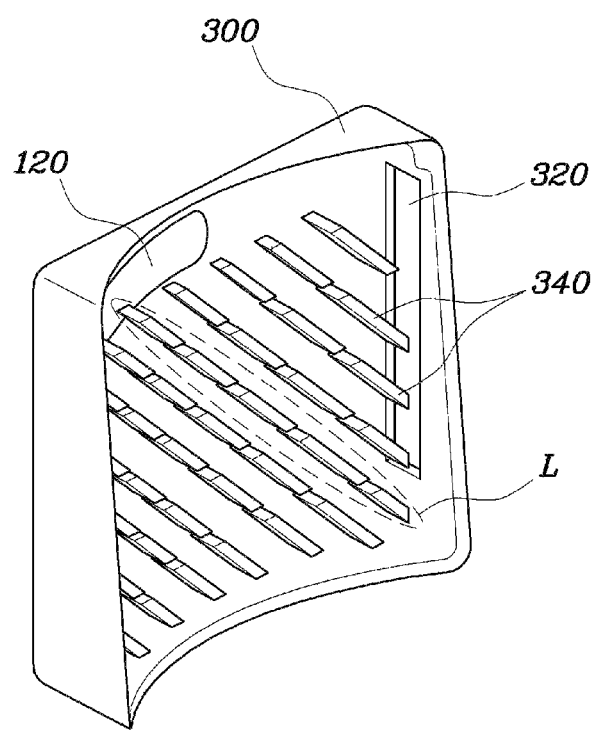
FIG. 5 and FIG. 6 are views showing heat exchanging units of a heating and cooling cup holder according to the present invention.
Figure 6:
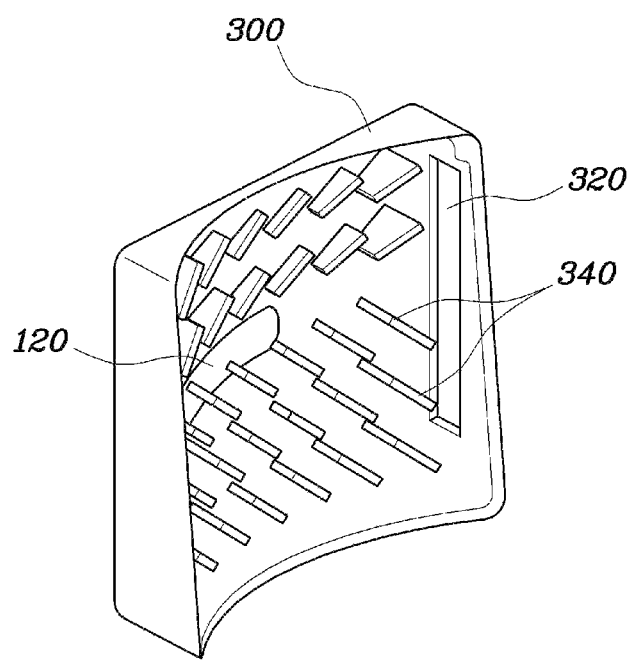

In detail, as shown in FIGS. 5 and 6, a plurality of guide ribs is arranged in lines L to define a series of channels from the intake port 320 to the air hole 120, so a plurality of guide rib lines L can be formed such that a plurality of channels is formed adjacent to each other. Therefore, air can be sufficiently conditioned through the channels and a loss of flow due to resistance can be minimized.

The front of the heat exchanging unit 300 is a curved surface being in close contact with the outer side of the inner holder 100, such that it can cool/heat the inner holder 100 as much as possible through conduction.

The outer holder 200 is cut off at the portion where the heat exchanging unit 300 is, surrounding the side of the inner holder 100, and the cut-off portion may be coupled to the heat dissipation module. Accordingly, the direct-coupling relationship of the inner holder 100-heat exchanging unit 300-peltier element 900-heat dissipation module can be maintained and the outer holder 200 surrounds the inner holder 100, such that the side of the inner holder 100 can be fully covered by other components.

Further, the heat dissipation module may include a heat sink 500 of which the front is in close contact with the rear of the peltier element 900 and a heat dissipation fan 600 coupled to the rear of the heat sink 500.

In the heat sink 500, a first side of the front may be in close contact with the peltier element 900 and the heat dissipation fan 600 may be coupled to a second side of the rear of the heat sink 500. Accordingly, a sufficient heat dissipation area is ensured.

The heat dissipation fan 600 receives the air having exchanged heat with the heat sink 500 and may have a discharge port 620 at a side. The inner holder 100, the heat exchanging unit 300, the peltier element 900, the heat dissipation module, the outer holder 200, and the blower 700 are disposed on the arm rest 10 of a vehicle, the heat dissipation fan 600 receives the air having exchanged heat with the heat sink 500 and has the discharge port 620 at a side, and the discharge port 620 may extend to a grill 20 that communicates with the outside of the arm rest 10. Therefore, waste heat produced by the peltier element 900 is discharged out of the arm rest 100, so it is possible to prevent waste heat from accumulating inside and to maintain the efficiency of the cup holder.

According to the heating and cooling cup holder having the structure described above, when keeping a drink cold or hot, it is possible to maximize the performance, as compared with existing refrigerators, and to prevent heat from leaking outside by controlling air flow, thereby improving thermal efficiency.

Therefore, it is possible to improve convenience for a user through rapid effect and improved performance and to rapidly provide a user with a cold drink or a hot drink in a vehicle, so a commercial value can be increased.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heating and cooling cup holder comprising:
   an inner holder, formed of a heat conductive material, receiving a drink through an open top of the inner holder, storing the drink, and having an air hole opened in a rostrocaudal direction of the inner holder at a side of the inner holder through which air flows inside;
   a heat exchanging unit, formed of a heat conductive material, directly engaging with an outer surface of the inner holder and covering the air hole with a front of the heat exchanging unit from an outside of the inner holder to directly conduct heat with an outside of the inner holder, and having an intake port at a first side of the heat exchanging unit and heat transfer fins inside the heat exchanging unit so that air flowing inside through the intake port exchanges heat through the heat transfer fins and then flows to a side surface of the drink in the inner holder through the air hole, thereby to transfer heat simultaneously through conduction and convection;
   a peltier element having a front thereof coupled to a rear of the heat exchanging unit, wherein the inner holder, the heat exchanger unit and the peltier element are coupled in series in a radial direction of the inner holder;
   a heat dissipation module coupled to the rear of the peltier element;
   an outer holder having an inner diameter larger than an outer diameter of the inner holder, surrounding the side of the inner holder, and defining a ventilation space together with the inner holder between the inner holder and the outer holder; and a blower disposed in the ventilation space, receiving air from the ventilation space, and having a discharge port connected to the intake port of the heat exchanging unit, wherein the front of the heat exchanging unit is a curved surface being in contact with the outer surface of the inner holder, such that the heat exchanging unit cools or heats the inner holder through conduction.

2. The heating and cooling cup holder of claim 1, wherein the heat exchanging unit has the intake port at the first side of the heat exchanging unit and is combined with the inner holder with the air hole near a second side of the heat exchanging unit.

3. The heating and cooling cup holder of claim 1, wherein the heat transfer fins are guide ribs guiding air which flows inside the heat exchanging unit through the intake port to the air hole.

4. The heating and cooling cup holder of claim 3, wherein the guide ribs are plate-shaped columns protruding from the rear of the heat exchanging unit and coming in contact with an outer side of the inner holder.

5. The heating and cooling cup holder of claim 3, wherein the guide ribs are arranged in lines to define a series of channels from the intake port to the air hole and a plurality of guide rib lines form a plurality of channels adjacent to each other.

6. The heating and cooling cup holder of claim 1, wherein the outer holder is cut off at a portion where the heat exchanging unit is, surrounding the side of the inner holder, and the cut-off portion of the outer holder is coupled to the heat dissipation module.

7. The heating and cooling cup holder of claim 1, wherein the heat dissipation module includes a heat sink having a front being in close contact with a rear of the peltier element and a heat dissipation fan coupled to a rear of the heat sink.

8. The heating and cooling cup holder of claim 7, wherein a first side of the front of the heat sink is in close contact with the peltier element and the heat dissipation fan is coupled to a second side of the rear of the heat sink.

9. The heating and cooling cup holder of claim 7, wherein the heat dissipation fan receives air having exchanged heat with the heat sink and has a discharge port at a side of the heat dissipation fan.

10. The heating and cooling cup holder of claim 1, wherein the inner holder, the heat exchanging unit, the peltier element, the heat dissipation module, the outer holder, and the blower are disposed on an arm rest in a vehicle.

11. The heating and cooling cup holder of claim 7, wherein the heat dissipation fan receives air having exchanged heat with the heat sink and has a discharge port at a side, and the discharge port extends to communicate with an outside of an arm rest.

* * * * *